United States Patent Office  3,451,918
Patented June 24, 1969

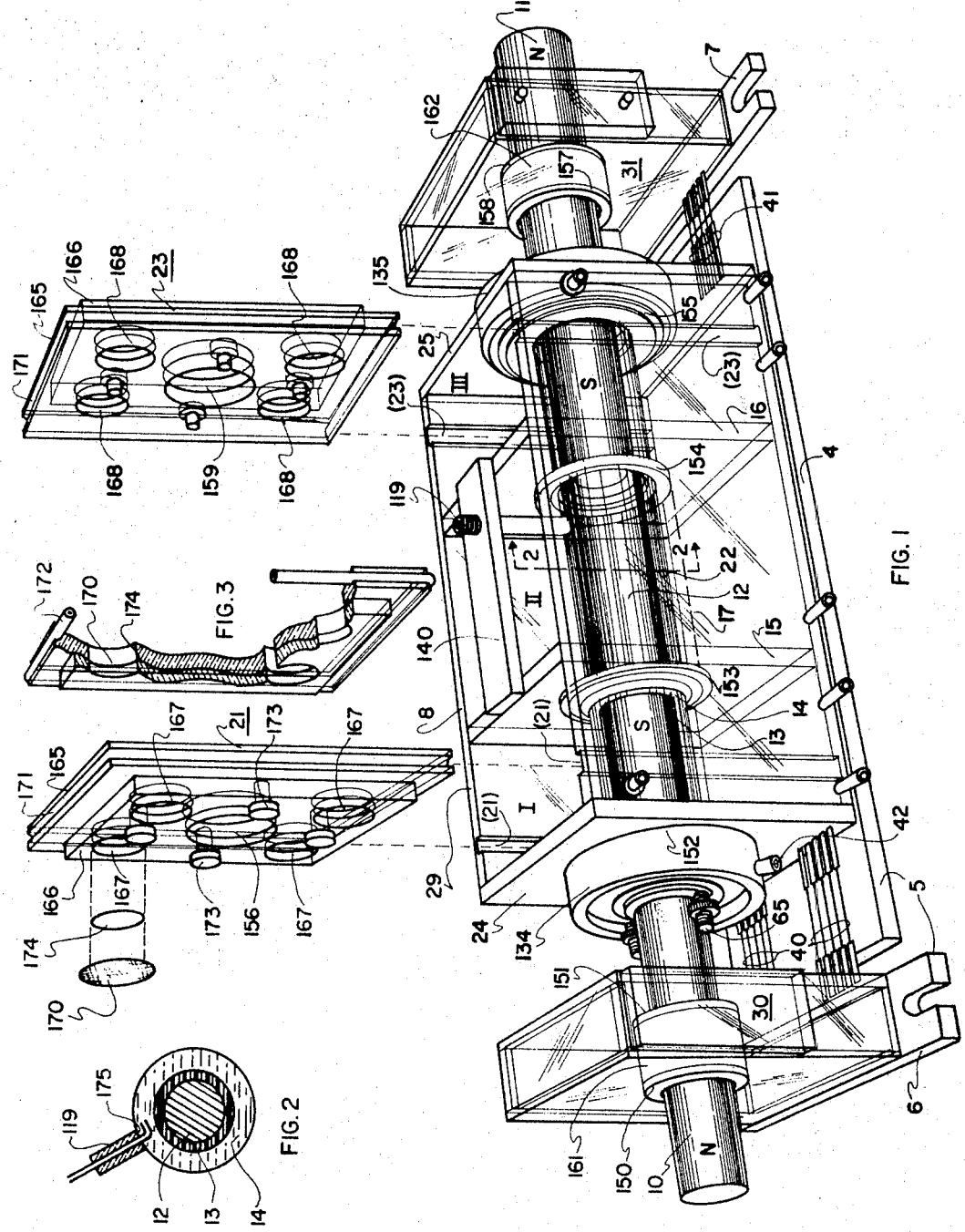

3,451,918
ELECTROPHORETIC FRACTIONATION APPARATUS
Alexander Kolin, Los Angeles, Calif., assignor to The Regents of The University of California, a corporation of California
Filed Oct. 22, 1965, Ser. No. 500,817
Int. Cl. B01k 5/00; B01d 13/02
U.S. Cl. 204—299                            9 Claims

ABSTRACT OF THE DISCLOSURE

A stabilized spiral magnetic-electrophoretic apparatus is provided for separating fractions of a chemical or biological substance. The apparatus is constructed so that the separated fractions of the substance may be collected continuously, and it includes a new and improved structure for introducing the electrophoretic buffering medium and the substance to be separated, so as to provide a longitudinal spiral flow with respect to the axis of an annular passage.

BACKGROUND OF THE INVENTION

In the electrophoretic separation of the particulate components of compounds of mixtures, an electric field is applied across a medium into which is introduced the substance to be separated into its components. The charged particles migrate in the medium at rates which are determined by electrophoretic mobilities and in directions determined by their charge polarities and by the direction of the electric field.

In the past, electrophoretic separations have been both slow and capable of only small, in fact, minute volumes of extracted components of the substance being so separated.

In a paper by the present inventor entitled "Continuous Electrophoretic Fractionation Stabilized by Electromagnetic Rotation" in the Proceedings of the National Academy of Sciences, volume 46, No. 4, pp. 509–523, published in April 1960, there was set forth the theory and principles of stabilization against thermal convection in electrophoretic media by the rotation of a fluid column under the influence of a combination of a longitudinal electric current with a radial magnetic field.

This invention contemplates improved magnetically stabilized electrophoretic apparatus for fractionation of substances wherein a radial magnetic field is created in an annular electrophoretic volume in which the radial field is maintained perpendicular to the electric field, and means are provided for continuously introducing buffering fluids in the electrophoretic volume to produce longitudinal (axial) movement of the electrophoretic volume and to stabilize the buffer with respect to losses due to various operational factors. The invention further contemplates means for injecting the substance to be fractionated in such fashion that the resulting fractions migrate in separate spirals of differing turns spacing or pitch within the annular electrophoretic volume permitting the continuous and simultaneous extraction of the separated fractions by individual pipetic extraction tubes appropriately positioned within the annular electrophoretic volume along the respective spiral migration paths beyond the injection point of the substance being fractionated.

Accordingly, it is an object of this invention to provide an electrophoretic fractionating apparatus wherein the resulting individual fractions may be continuously extracted in individual extraction receptacles.

It is a further object of this invention to provide a magnetically stabilized electrophoretic fractionating apparatus wherein the separation process is stabilized by means which continuously replenish the buffer solution as it is lost due to various operational factors in the fractionation.

It is another object of the invention to provide a magnetically stabilized electrophoretic spiral fractionating system wherein electric field gradients due to buffer fluid loss and temperature gradients due to convection are reduced to a minimum.

It is an even further object of this invention to provide magnetically stabilized electrophoretic fractionating apparatus including means for introducing the electrophoretic medium longitudinally with respect to the axis of an annular electrophoretic volume therein, and for tapping off at predetermined different positions of the annular volume to extract the separated fractions continuously and simultaneously.

It is yet another object of this invention to provide magnetically stabilized electrophoretic fractionating apparatus wherein there is an annular electrophoretic volume having a constant ratio of flow thereof to the injected volume of electrophoretic medium which may be expressed as:

$$\frac{\text{Flow Volume}}{\text{Injected Volume}} = K$$

It is a still further object of this invention to provide electrophoretic separation apparatus having a high degree of stability against buffer fluid loss and temperature variations, and which permits continuous and rapid fractionation of substances of even gross molecular composition.

These and other objects of this invention will be more fully understood from the specification which follows, wherein a preferred embodiment of the invention is described, when taken together with accompanying drawings and the appended claims.

In the drawings:

FIG. 1 is a perspective drawing showing partly in exploded form an embodiment of the invention, the view herein being of an article fabricated in a clear substance such as an acrylic plastic so as to expose to view internal structures thereof;

FIG. 2 is a cross section through 2—2 of FIG. 1;

FIG. 3 is a fragmentary detail of a separator such as shown in FIGURE 1;

Figure 4:
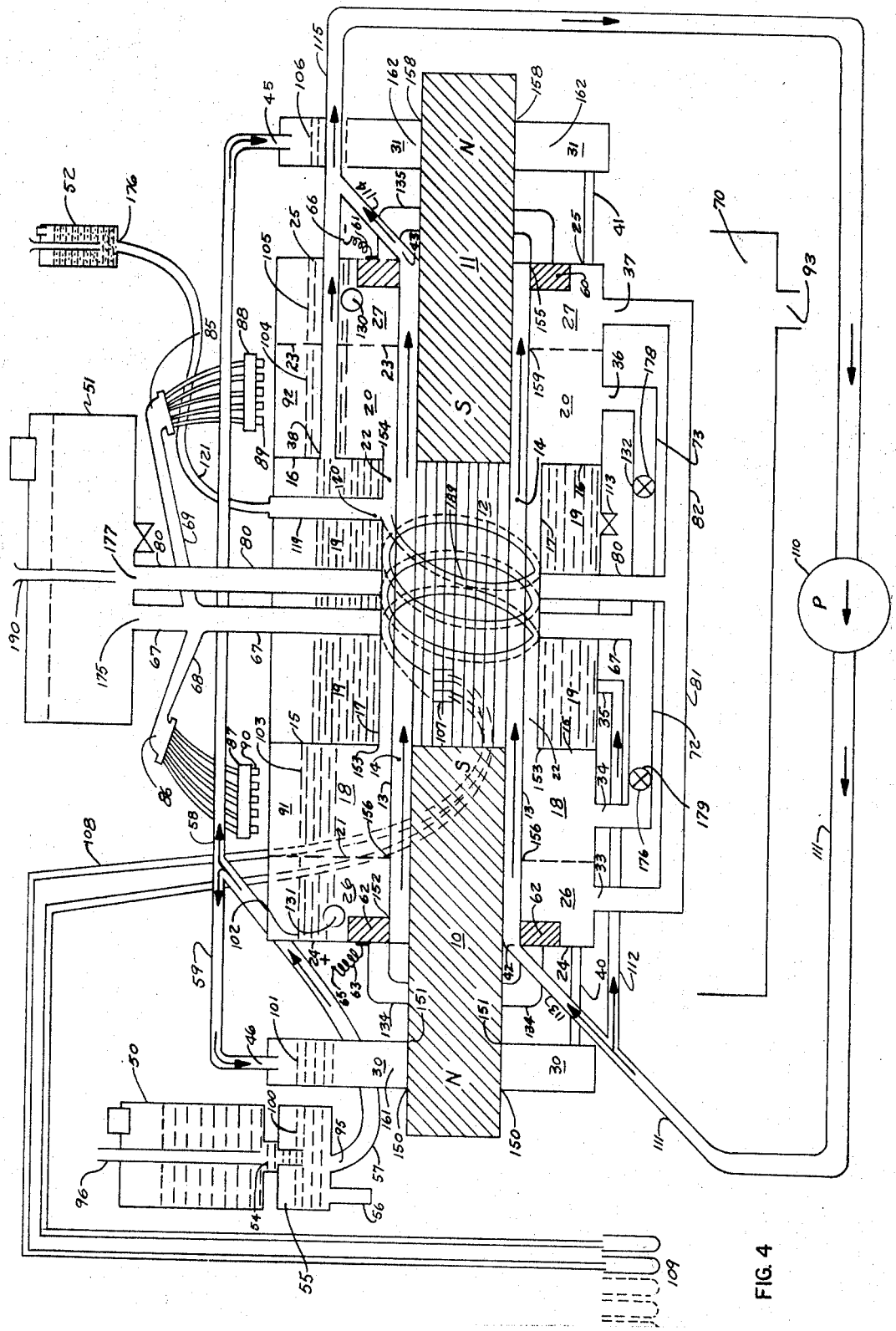
FIG. 4 is a schematic longitudinal section axially through the article shown in FIG. 1 showing the detailed interior configuration thereof and including fluid sources, outlets and intercouplings thereof not shown in FIG. 1.

It is well known that the heat generated at the boundaries of the separate particles migrating in electrophoretic media results in changes in the definition of the boundary because of the thermal convection currents which develop. To dispose of this factor in the past, flat sheet techniques have been used so as to expose more surface and more rapidly dissipate heat. Other techniques have employed cool water baths in which the temperature of the bath was that of maximal density of the solution used for the electrophoretic carrier and this would have minimal convection.

It is equally well known that so long as the concentration of univalent ions in buffer solutions remain constant with other factors remaining stable, the best separation is obtained of particles being separated in the electrophoretic medium.

These factors are particularly important in zone electrophoretic applications.

In the present invention, as shown in the figures and hereinafter more fully described, the form of electrophoretic action employed is of a zone type wherein a continuous separation of ions in solution is accomplished by making charged particles of different mobilities follow divergent paths. In the apparatus of this invention, the paths of the separants are spiral and flow about an annular cylindrical flow path at different pitches.

So long as the buffering solution is maintained constant in its ion concentration (pH value) the pitch of any separating charged particle path therethrough will be uniform; and by appropriate choice of, and control of the specific stable concentration value, the spiral paths followed by the separating charged particles will diverge without crossover or interference with one another.

In FIG. 1, there has been drawn a spiral electrophoretic separation apparatus according to this invention with the walls and separating sections constructed from a clear plastic substance such as methyl methacrylate or the like so as to reveal the interior configuration of the several chambers thereof and the means by which the spiralling of the separated fractions of the substance being separated is accomplished. In FIG. 1, none of the fluid interconnections such as tubing and the like are shown, nor has there been included a series of buffer reservoirs, material-to-be-separated sources and separant outlets further detailed in FIG. 2. This has been done so as to more clearly show the configuration of the various fluid chambers herein employed which constitute the novel arrangement in this invention.

In FIG. 1, a base structure 5 is shown comprising a central base portion 4 and end base pieces 6 and 7. On central base portion 4 is constructed an open-topped rectangular housing 8 including longer side walls 29 and shorter end walls including left end wall 24 and right end wall 25. Within housing 8 are separator panels 15 and 16 by which the housing 8 is divided into three sections identified as I, II and III. In side walls 29 of sections I and III are included grooves (21) and (23) to receive dialyzing membrane panels 21 and 23 which will be more fully described hereinbelow. In the absence of the dialyzing panels 21, 23, it is to be noted that the structure of the compartments I, II and III is similar to that shown in the abovementioned paper in the Proceedings of the National Academy of Sciences. When assembled, housing 8 and walls 15, 16 or 21, 23 (when inserted), seal the chambers formed.

On the left end base section 6, an independent fully enclosed rectangular reservoir section 30 is disposed while on right base section 7, a similar but mirror image rectangular reservoir 31 is disposed. The reservoirs 30, 31 and the rectangular housing 8 are in alignment on base 5.

Through the center of the aligned reservoirs 30, 31, end walls 24, 25, dialyzing membrane panels 21, 23, and separator panels 15, 16, and having a common axis in the centers thereof, there are provided circular apertures 150–159 to receive a number of cylindrical structures as hereinafter defined.

From either end of the assembly of housing 8 and reservoirs 30, 31 on base 5, through the central apertures 150–159, there is inserted a pair of cylindrical bar magnets 10, 11 separated at the center by an iron core 12 of the same cross sectional dimension as bar magnets 10, 11. The respective South poles of magnets 10, 11 butt against core 12. The repulsion fields generated result in a radial magnetic field in and about core 12 as further described below. Magnets 10 and 11 are sealably supported in the center axis by tight-fitting cylinders 161, 162 in reservoirs 30, 31. The respective North poles of magnets 10, 11 project out of the ends of reservoirs 30, 31.

Within chamber II formed by walls 15, 16 and chambers I and III magnet structure 10, 11, 12 is enclosed by a cylinder 13 leaving a cylindrical gap 14 surrounding the magnet structure running the length of the housing 8 from end wall 24 to end wall 25 and best seen in FIG. 2. The end caps 134 and 135 on the outside of walls 24 and 25, respectively seal the cylindrical gap 14. An inlet nipple 42 is provided on end seal 134 to receive cold water and a similar outlet nipple not shown in the drawing is provided in end seal 135 for the outflow of the cold water which is passed over magnetic structure 10, 11, 12 as a coolant. It should be noted here that other cooling fluids may be employed as the particular use of the instrument according to this invention requires. The gap 14 through which the water or other coolant is passed is a cylindrical fluid wall about magnet structure 10, 11, 12.

Within chamber II formed by walls 15, 16 concentrically surrounding and on a common axis with cylinder 13, a cylinder 17 is provided sealed into circular openings 153 and 154 so as to provide an open cylindrical path 22 around coolant cylinder 14, 13 communicating into chambers I and III at circular openings 153 and 154 so that there is full communication through cylindrical path 22 between chambers I and III for any fluids in chambers I and III.

The circular apertures 156, 159 in dialyzing plates 21, 23 are dimensioned so as to sealably enclose cylinder 13 in chambers I and III, when the dialyzing plates are inserted in their respective grooves (21) and (23).

Dialyzing plates 21 and 23 consist of a backing plate 165 and a filter support and pressure plate 166. Plate 166 is of the same rectangular shape as plate 165, but the latter is larger in perimeter than the former. Plate 166 is centered on plate 165 so that the four filter apertures 167 (on plate unit 21) and 168 (on plate unit 23) are in alignment with corresponding apertures on backing plate 165.

The dialyzing membrane 170 is preferably a circle of a Millipore filter or cellulose sheet pressed between methyl methacrylate plates 165 and 166 against an O-ring or other gasket element 174 so as to provide sealing action around the apertures 167 and 168.

The grooves 171 about the periphery of plate 165 are provided to receive a rubber tubing 172 or other gasketing means to provide sealing of plate 165 in groove (21) or (23) when filter plates 21 and 23 are inserted into grooves (21) and (23).

Screws 173 are employed to hold plates 165 and 166 together and press membranes 170 against O-rings 174 in plates 165.

In cylinder 17 at a point which is predetermined by the desired separation to be accomplished with the apparatus but in any even along a central line at the upper most portion of the cylinder 17, there is provide an aperture to receive injector 119 with spout element 176 having a bent outlet tip 120 through which the mixture to be separated is injected into the space 22 between cylinder 17 and water coolant jacket 13 as further described hereinbelow.

Referring now to FIGS. 1 through 4 together and particularly to the flow structured schematic of FIG. 4, it can be seen that when the structure of the magnetically stabilized electrophoretic fractionation apparatus as above described is fully assembled, it includes a pair of magnets 10, 11 whose South Poles S in FIG. 1 and whose South Poles S in FIG. 4 contact a soft iron cylindrical core 12 which results in core 12 being surrounded by substantially radial magnetic field close to the cylindrical surface of core 12. The magnet rod or cylinder assembly 10, 11, 12 is surrounded by a plastic cylinder 13 leaving a gap 14 close to the magnetic structure 10, 11, 12 through which cooling water can be circulated between the magnet 10, 11, 12 and cylinder 13. This water is circulated by a pump 110 (shown in FIG. 4) through piping 111, 113 entering space 14 through inlet 42 and exiting therefrom at outlet 43 into tubing 114 which joins tubing 115 to return to pump 110 for recirculation. A secondary coolant path 112 branches off tubing 111 entering chamber 19 (corresponding to chamber II previously described) at inlet 35 to fill chamber 19 with cooling water, circulating the water therethrough and exiting at outlet 38 to surround plastic cylinder 17 with cooling water. There will thereby be created a parallel coolant flow through cylindrical gap 14 over magnet core structure 12 and in chamber 19 outside of cylindrical gap 22. Since cylinder 13 is a common wall for both gaps 14 and 22, gap 22 is thereby being cooled by both coolant flow paths, i.e. the path through gap 14 and that around cylinder 17 through chamber 19.

It should be noted here that those familiar with the arts appertaining thereto may conceive other means of cooling the gaps 14 and 22. It may occur to some or be preferable in some applications of the invention to employ independent coolant paths for gap 14 and through tub or chamber 19, each circulated my separate pumps such as 110.

In a preferred embodiment of the invention wherein electrophoretic separations are made, the gap 22 was chosen to be 2 mm. wide and, as has been previously described, communicates with chambers 18 and 20 on either side thereof so that buffer solutions in chambers 18 and 20 are also present in gap 22.

When fully assembled, the four cellulose or millipore dialyzing membranes 170 in each of plates 21 and 23 separate the chambers 26 from 18, and 27 from 20. Chambers 26 and 27 are electrode chambers and include along the inner surfaces of walls 24 and 25 (see FIG. 4), electrode 60 and 62 which have external conductive connections 65 and 66. Terminal conneceion 65 is the + pole and terminal connection 66 is the — pole.

The dialyzing membranes 170 isolate the electrode chambers 26, 27 from the buffer chambers 18, 20 hydraulically, but permit easy passage of an electric current between electrodes 60 and 62 through chambers 26, 18, annular gap 22, chambers 20, and 27.

As may be seen in FIG. 1 and shown schematically in FIG. 4, the buffer reservoirs 30 and 31 are connected to electrode chambers 26 and 27 by the manifolds 40 and 41. Buffer solution is supplied to these reservoirs as is shown in FIG. 4 from a Mariotte bottle 50 which has an outlet 54 dipping into a lower reservoir 55. The outlet 95 of reservoir 55 is coupled by a branched tubing 57 to inlets 45 and 46 of reservoirs 30, 31 via branches 58 and 59. A Mariotte bottle is a chemical apparatus that furnishes a flow of fluid under a constant head of pressure equal to the height of the bottom of a tube in the center thereof above the level of an outlet opening therein where the outflow jet thereof issues. While the drawing is not shown in this way for convenience of illustration, it is pointed out that the branches 58 and 59 should in fact be of equal length.

The liquid level 100 in reservoir 55 is adjusted to be even with levels 101 and 106 of reservoirs 30 and 31, and as further indicated below, with the levels 102, 103, 104 and 105 in chambers 26, 18, 20 and 27. This is accomplished by the adjustment of air intake tube 96 in Mariotte bottle 50 to such a depth that as soon as the level in reservoir 55 falls below the present level, atmospheric air enters Mariotte bottle 50 forcing fluid from bottle 50 into reservoir 55. This arrangement minimizes flow fluctuations caused by the discontinuous supply of air due to bubbles that may enter Mariotte bottle 50 and facilitates the quick replacement of Mariotte bottle 50 with a fresh full one in long continuous separation runs with the apparatus of this invention when the buffer supply becomes exhausted. The buffer solution from reservoir 55 enters supply reservoirs 30, 31 and renews that in electrode compartments 26 and 27 when the composition of the buffer solution therein is altered through electrolysis during the separation run. Overflow outlets 130, 131 are provided in compartments 26 and 27 for excess buffer spillover.

A second Mariotte bottle 51 (larger than Mariotte bottle 50) can be described as the master buffer reservoir which provides the major supply of buffer solution to compartments 26, 27 and 18, 20. Branched tube 67 connects one outlet 175 of Mariotte bottle 51 through branch tubes 72 and 73 and inlets 34 and 36 to buffer chambers 18 and 20. Appropriate valves 179 and 178 are included in the branch tubes 72 and 73, respectively. A secondary pair of branch tubes 68 and 69 from tube 67 couple line 67 to manifolds 85 and 86 each of which consists of five thin tubes which preferably are 0.7 mm. I.D. and 50 cm. long and which provide for a slow outflow from Mariotte bottle 51 which can be determined by counting and timing the emerging drops. The tubes 89, 90 of manifolds 85 and 86 can be evenly distributed over chambers 18 and 20 or they may be arranged with more in chamber 20 than in chamber 18 so as to create an axial flow distribution from chamber 20 toward chamber 18 through annular space 22. This control of buffer solution volumes and flow constitutes a significant advance in the present apparatus over prior designs and allows the continuous fractionation of particulates.

This method of injection of buffer fluid into the chamber 20 compensates for loss due to the extraction of separated particles as will be further described below. After the observations necessary to time and count the drops that have been made, the manifolds 85 and 86 are submerged into the fluids in chambers 18 and 20 so as to avoid pulsations in the axial flow.

A second branched tube 80 is coupled from oulet 177 of Mariotte bottle 51 (the master buffer solution reservoir) into electrode chambers 26 and 27 through branch tubes 81 and 82 and inlets 33 and 37. The levels of buffer solution in chambers 26 and 27 are controlled through the action of Mariotte bottle 50 and manifolds 40, 41 as previously described. Overflow from chambers 26 and 27 exits from outlets 130, 131. A drip pan 70 which has an outlet 93 is provided to catch the overflow.

A very small third Mariotte bottle 52 is provided from which a steady stream of the mixture to be fractionated is injected into the annular space 22. The outlet 176 of Mariotte bottle 52 is coupled through tube 121 into inlet element 119, and through this inlet fluid from bottle 52 is injected through the outlet 120 thereof into annular space 22 between cylinders 13 and 17.

The injector assembly 119–120 is tightly pressed into cylinder 17 so that its outlet 120 is appropriately positioned in axial cylindrical path 22. Cross bar 140 of FIG. 1 is provided to hold injector 119 in place.

The adjustment of assembly 119–120 into annular electrophoretic cylinder space 22 is such that the outflow at 120 of streaks of the mixture to be fractionated is into the center of the annular electrophoretic migration path 22.

Figure 5:
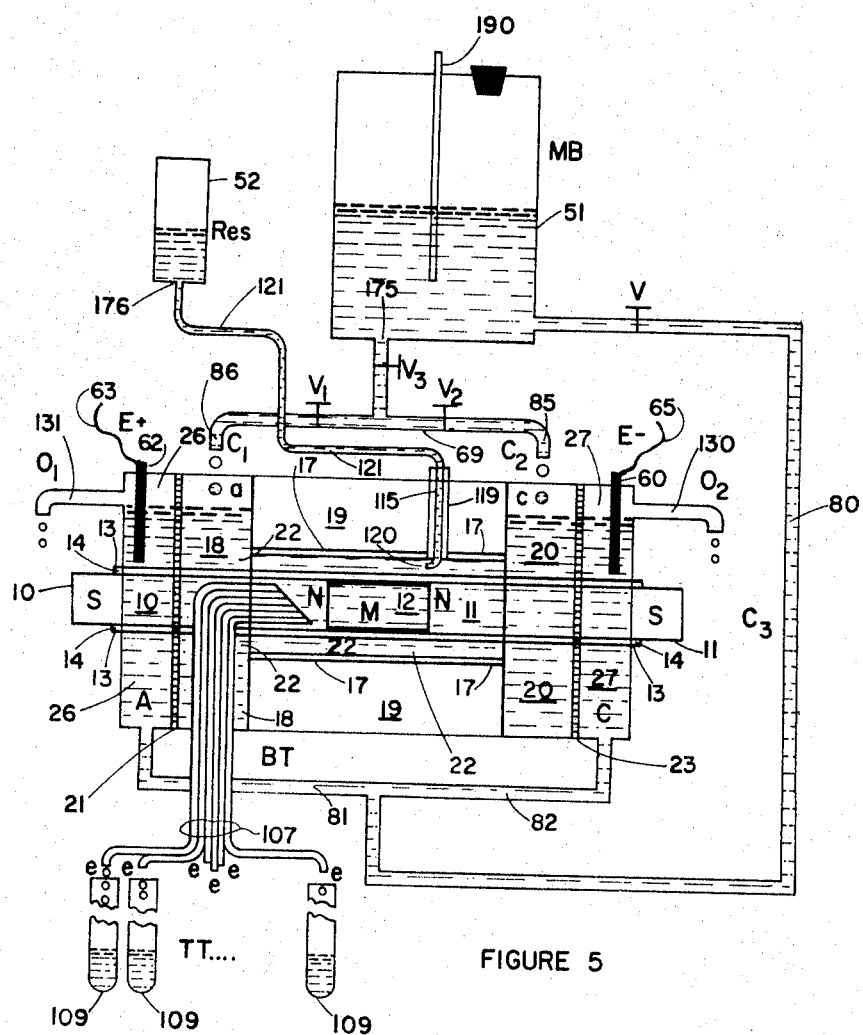
FIG. 5 is a simplified schematic diagram showing an embodiment of the invention similar to that in FIG. 4 but involving fewer components.

The schematic diagram of an embodiment of the invention in FIG. 5 shows an electrophoresis cell stabilized by electromagnetic rotation, set up for collection of negatively charged particles migrating toward the left. The implementation of the invention herein is simpler than as previously described for the device in FIG. 4. The magnetic rods 10 and 11 correspond to those described in the preceding figures and are positioned on opposite ends of a soft iron cylinder 12, with the same poles of each magnet 10–11 (North in this instance) against the soft iron cylinder 12. This configuration as has been previously described produces a radial magnetic field extending outwardly from the soft iron cylinder 12. The inner plastic tube 13 which surrounds the magnet structure 10–11–12 permits a coolant fluid flow through space 14 about magnet structure 10–11–12 for maintaining a constant temperature thereabout.

The outer plastic tube 17 shorter than tube 13 and larger in diameter than tube 13 forms with tube 13 an annular electrophoretic migration space 22. Electrodes 60 and 62 in electrode compartments 26 and 27 are connected to external sources of electric unidirectional potential via leads 63–65.

The annular cylinder 22 couples together buffer compartments 18 and 20. Electrically conductive membranes 21–23 respectively separate the electrode compartment 26 from buffer compartment 18 and electrode compartment 27 from buffer compartment 20, hydraulically. The location of the electrically conductive membranes 21, 23 may be other than as shown for particular uses of the apparatus.

Pick-off tubes 107 are arranged within cylinder 22 in a bundle with an obliquely cut end of each adjacent tube being extended further into the electrophoretic path in space 22 to a point where a particulate spiral of one of the separant effluxes will reach independently of the other separant paths. The other end of tubes 107 terminate in collection vessels 109 each of which receives one of the separant effluxes simultaneously with the others. The collection vessels may be test tubes or other similar receptacles. There are other means of introducing collectors of the separants which will occur to those skilled in the art.

As in the other figures, Mariotte bottles such as 51 supply buffer to the separation cell drop by drop through outlets 85 and 86 with control by valves V1, V2 and V3 being used to maintain a constant rate of flow in the right to left direction from chamber 20 through annular channel 22 to chamber 18. Through tube 80 and branches 81–82 buffer is also supplied to electrode chambers 26–27 with overflow exiting from outlets 130–131.

When power is applied to electrodes 62–60, the electric field developed through cylinder 22 between buffer compartments 18–20 interacts with the radial magnetic field of magnet structure 10–11–12 to result in a spiral or rotational migration of the buffer fluid right to left.

When a substance to be electrophoretically separated is injected into annular buffer flow path 22 through injector 115–119–120 from reservoir 52 (another Mariotte bottle) as the substance separates into its particle components under the action of the electric field and the rotation of the buffer, the heavier particles rotate more slowly and the lighter more rapidly each spiralling out at its predetermined pitch to the ends of the pick-off tubes 107 where they discharge into vessels 109.

The operation of the completed assembly as shown in full schematically in FIG. 4 and in FIG. 5 is initiated when a current is applied to electrodes 60–62. In annular electrophoretic migration space 22 through the Mariotte bottles 50–51 (FIG. 4) and the appropriate tubing and chambers 18–20 previously described, there is injected buffer of pH 10 such as the commercial product "Hydrion" diluted 1:15 from a stock solution of one buffer tablet per 100 ml. The current applied is about 25 ma. at a potential of 195 volts. Due to the tangential electromagnetic forces resulting from the interaction of the axial electric current through space 22 and the radial magnetic field perpendicular to the axial current, the buffer fluid in the annular electrophoretic migration space 22 is set into a uniform rotational motion.

Since particles emerging from injector outlet 120 are usually electrically charged, they do not describe a circular path but rather a spiral one. The spiral path is due to the participation of the charged particles of the mixture ejected from outlet 20 with the rotation of the fluid and the axial migration of the particles due to the electrophoretic action in annular space 22, relative to the buffer solution therein, plus the axial velocity component imparted into the buffer solution in space 22 by the flow control means described above. In FIG. 4 at 189, a dashed line and a solid line represent spirals of two particles of different electrophoretic mobility.

There may be as many as 10 or more of the different particles in the mixture, each of different electrophoretic mobility, so that a number of spirals adjacent one another may appear.

As shown in FIGS. 4 and 5, a series of pipetic pick-off tubes 107 are carefully positioned and spaced apart within annular space 22 at a distance from the injection outlet 120 and on a line 90° over on the downflow side of the rotating fluid in annular space 22 to receive individually the several spiralling migrating particle flows. Each particle outflow is carried by one of the separate tubes 108 into collecting vessels 109 thereby providing individual separated particle elements of the mixture in the collecting vessels 109. These individual separants may fall simultaneously into their respective receptacles (collecting vessels 109).

The positioning of pick-off tubes 107 (called the extractor as an assembly) in annular space 22 is such that their inlet ends are within the fluid in space 22 and parallel to the axis of magnetic structure 10–11–12 and intersecting each spiral at an angle approximating 90°. The tubes 107 are arranged also so as to have their lower ends below the level of fluid in buffer compartments 18, 20 so that the buffer solution is thus siphoned out from the annular space 22 (the separation cell) at the spiral pick-offs at a rate determined by the difference in level between the buffer chambers 18, 20 and the position of extractor tubes 107. The outflow is in drop form and is collected in collecting vessels 109.

The diameter of the tubes in extractor 107 and their number equals the diameter and number of those in manifold assemblies 89 and 90. If the time interval between the drops 91, 92 emerging from manifolds 89, 90 is adjusted to equal the time interval between consecutive drops falling into collecting bottles 109, the liquid level in compartments 18, 20 will remain constant since the influx of buffer solution from Mariotte bottle 51 will equal the rate of efflux of separated particles. Even if the manual adjustment is not quite so precise when initially made employing the flow control system herein described, there will be an automatic readjustment after a short interval which will equalize the inflow and outflow.

Assuming that the rate of outflow exceeds the rate of inflow; then the level in compartments 18, 20 drops, diminishing the rate of escape of liquid from chambers 18, 20 until the inflow rate from manifolds 89, 90 has been equalled.

If, conversely, the escape of fluid from 18, 20 is slower than the influx from manifold outlets 89, 90, the level in chambers 18, 20 rises thus accelerating the outflow until the rate is equal to the influx. The rate of outflow into extractor 107 is therefore maintained at a constant level.

The rate of axial flow between chambers 20 and 18 can be retarded or increased by moving some of the outlets 89, 90 of manifolds 85, 86 from one side to the other so there are more on one side than the other. Rates of flow can also be adjusted by raising or lowering Mariotte bottle 51 or for even finer adjustment by raising or lowering air intake tube 190. Optimum operation is achieved when the ratio of axial flow volume to injected volume remains constant.

The current applied at terminals 65, 66 to electrodes 60, 62 should be maintained constant because any variation in current will cause a change in the rate of rotation of the fluid in the electrophoretic column in annular space 22 and so vary the pitch of the separate particle spirals. This could result in the delivery of particles of the $n$th spiral to the next or preceding receptacle and as contaminate the separated particles.

By the water cooling systems through chamber 19 and water column 14, the temperature is maintained constant about the electrophoretic column. Temperature variation could also vary the pitch of the spirals with the same undesirable results mentioned above.

The separation of the electrode compartments 26, 27 from the electrophoretic column buffer solution compartments 18, 20 by dialyzing membranes 21, 23, allows rapid renewal of the buffer solution near the electrodes so that alteration of the electrolyte in the electrophoretic column (annular space 22) is suppressed. The same objective is further accomplished by the replenishment of buffer from Mariotte bottle 51 as hereinabove described.

An additional advantage of the use of membranes 21, 23 is that it prevents gas bubbles developed in electrode compartments 26, 27 owing to the electrolytic action thereon from entering buffer chambers 18, 20 and electrophoretic column 22 and thereby avoiding their possible entry into extractor tubes 107 and fouling the flow.

It is to be noted that an increase in current diminishes the spiral pitch so that fine control can be achieved by adjustments of current.

It is recognized that the foregoing description merely illustrates the principle of this invention and is in no way limiting upon the scope of this invention, which instead is defined by the claims appended hereto. Those skilled in the art could well modify the specific apparatus disclosed without departing from the principle of the invention and such modifications would in no way offer immunity from the exclusive rights to this invention as defined below.

What is claimed is:

1. In electrophoretic separation apparatus which is stabilized against thermal convection, the combination of:
   a base structure;
   a first tubular member mounted on said base structure and defining an electrophoretic migration column;
   a first housing defining a first buffer fluid chamber mounted on said base at one end of said tubular member;
   a second housing defining a second buffer fluid chamber mounted on said base at the other end of said tubular member;
   said first tubular member intercoupling said first and second buffer fluid chambers for the flow of fluid through said tubular member from said first chamber;
   first and second electrodes respectively positioned in said first and second chambers for producing an electric field longitudinally of said column between said first and second chambers so as to cause a migration of particle components of a substance to be separated along said column;
   magnetic means for producing a magnetic field in said column extending radially across said column and transversely to said electric field to exert tangential forces on said particle components migrating along said column to cause said particle components to assume different spiral paths;
   a source of buffer fluid coupled to said first and second buffer chambers and having means for continuously supplying buffer fluid to said chambers and maintaining an essentially constant level of buffer fluid in said chambers to compensate for extraction losses and to maintain a predetermined axial flow distribution in said column;
   means for injecting into said first tubular member a substance to be electrophoretically separated by the buffer fluid flow in said migration column; and
   pick-off means positioned in said migration column to intersect said particle components migrating along said spiral paths.

2. The combination defined in claim 1, in which said magnetic means is positioned coaxially with said tubular member to produce the aforesaid magnetic field in said migration column, said magnetic field extending through said column at right angles to said electric field so as to exert the aforesaid tangential forces on said particle components migrating along said column.

3. The combination defined in claim 2, in which said magnetic means comprises a pair of axially aligned permanent magnets and an interposed magnetizable core all extending coaxially within said first tubular member, said permanent magnet exhibiting like poles to said core.

4. The combination defined in claim 1, and which includes a pair of electrically conductive dialyzing membranes extending respectively across said first and second buffer fluid chambers and sealed thereto to separate each of said chambers into an electrode section and a buffer fluid section, said membranes serving to isolate hydraulically said sections from one another in each of said chambers while affording electrically conductive paths between said sections.

5. The combination defined in claim 4, and which includes first means including tubular members coupling said source of buffer fluid to said electrode sections in each of said chambers, and second means including further tubular members coupling said source of buffer fluid to said buffer fluid section in each of said chambers.

6. The combination defined in claim 4, and which includes first and second reservoirs respectively coupled to the electrode sections of said first and second chambers in a hydrostatic relationship therewith, and a further source of buffer fluid coupled to said first and second reservoirs for maintaining the buffer fluid in said first and second reservoirs and in said first and second electrode sections at a predetermined level.

7. The combination defined in claim 1, and which includes adjustable tubular means selectively coupling said source of buffer fluid to said first and second buffer chambers for establishing and maintaining a predetermined rate of flow into said buffer chambers to compensate for the outflow of buffer fluid from said migration column with said extracted components.

8. The combination defined in claim 7, in which said tubular means includes a plurality of individual tubular members individually adjustable to supply the buffer fluid from said source selectively to said first and second chambers.

9. The combination defined in claim 1, and which includes a second tubular member coaxial with said first tubular member, and means coupled to said second tubular member for circulating a coolant therethrough.

References Cited

UNITED STATES PATENTS

| 2,741,591 | 4/1956 | Dewey et al. | 204—299 |
| 3,207,684 | 9/1965 | Dotts | 204—299 |
| 3,287,244 | 11/1966 | Mel | 204—299 |
| 3,305,471 | 2/1967 | Munchhausen et al. | 204—299 |
| 3,320,148 | 5/1967 | Skeggs | 204—299 |

OTHER REFERENCES

Kolin, "Continuous Electrophoretic Fractionation Stabilized by Electromagnetic Rotation" in Proceedings National Academy of Sciences, vol. 46, 1960, pp. 509–523.

JOHN H. MACK, *Primary Examiner.*

E. ZAGARELLA, JR., *Assistant Examiner.*